Dec. 12, 1933.   H. I. WRIGLEY   1,938,885
HAND BRAKE FOR RAILWAY CARS
Filed June 25, 1932   2 Sheets-Sheet 1
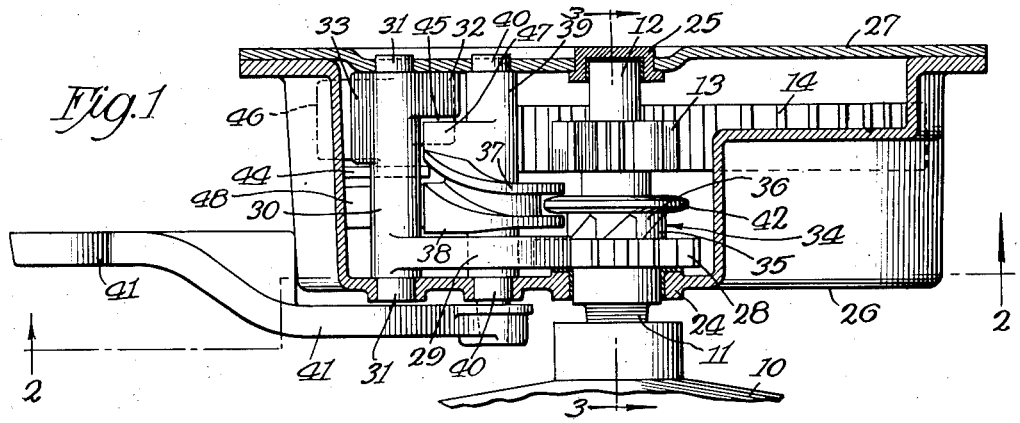
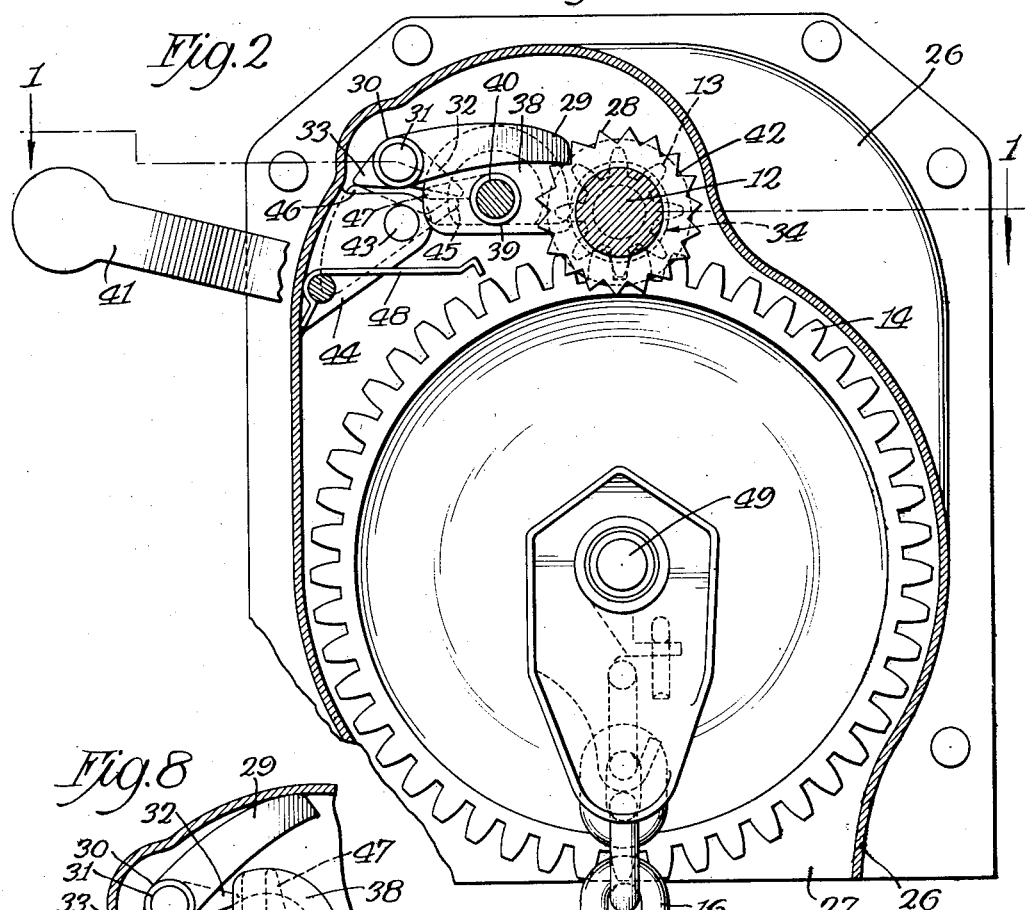
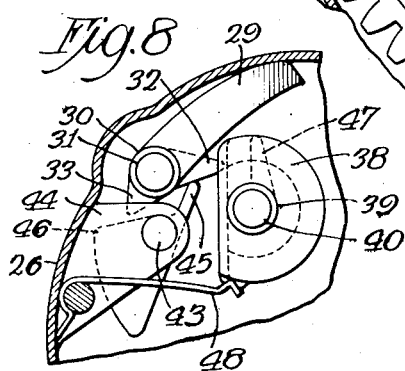
Inventor
Henry I. Wrigley Dec. 12, 1933.  H. I. WRIGLEY  1,938,885
HAND BRAKE FOR RAILWAY CARS
Filed June 25, 1932  2 Sheets-Sheet 2
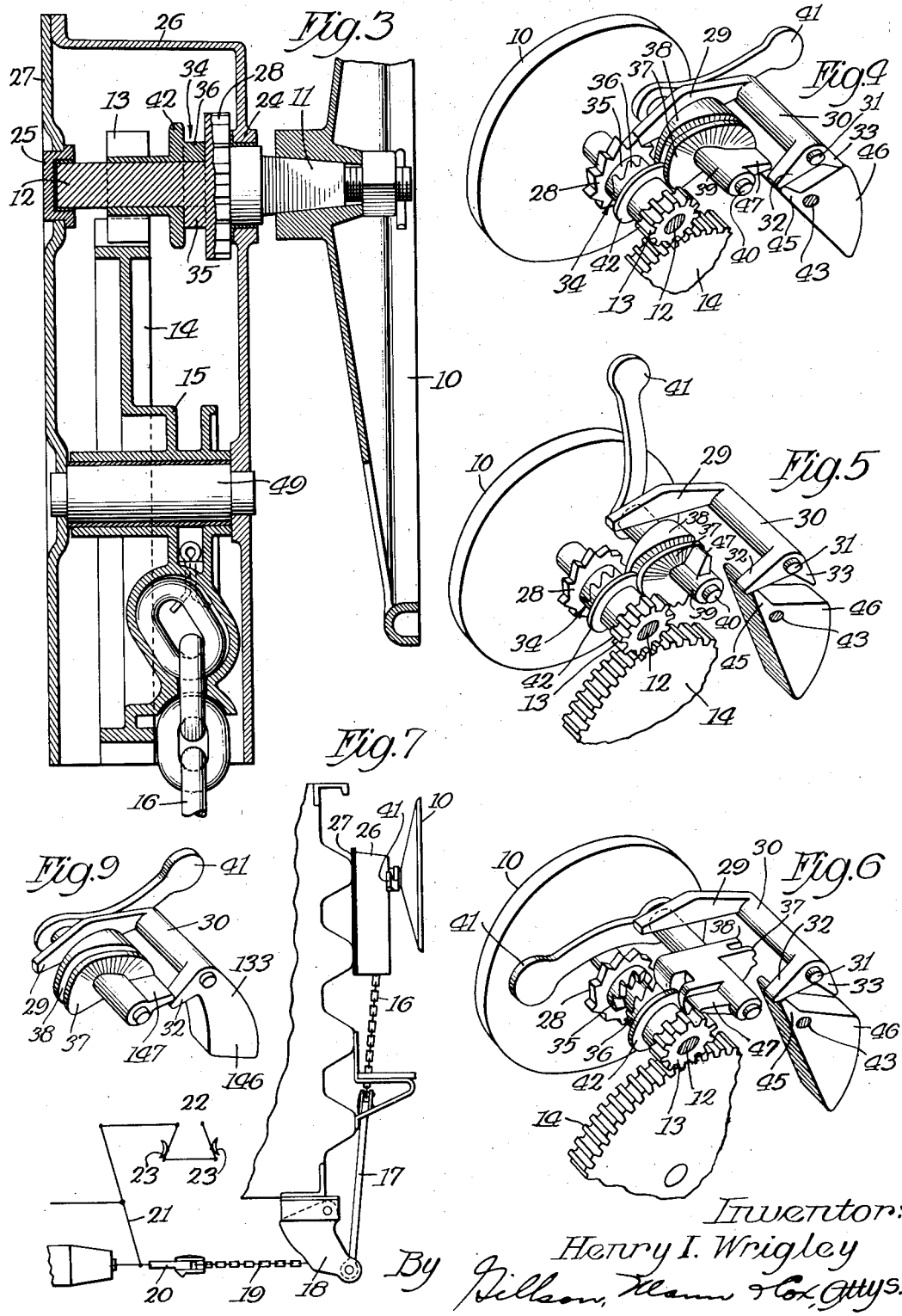
Inventor:
Henry I. Wrigley

Patented Dec. 12, 1933

1,938,885

UNITED STATES PATENT OFFICE 1,938,885

HAND BRAKE FOR RAILWAY CARS

Henry I. Wrigley, Chicago, Ill., assignor to Universal Draft Gear Attachment Co., a corporation of Illinois Application June 25, 1932. Serial No. 619,254

9 Claims. (Cl. 74—112)

Hand brakes include a ratchet for holding the brakes applied or set, in which position the entire brake rigging is under strain and there is an elastic reaction equal to the combined pressure on the brake shoes. Release is accomplished by applying additional pressure, disengaging the ratchet and then relaxing the power on the hand wheel, or other handle. In this operation the brakeman is likely to lose control and be injured by the back spin of the wheel.

Since the hand brakes have been designed to deliver greatly increased pressure, the danger has grown in proportion.

The principal object of this invention is to provide mechanism that will enable the brakeman to release the brakes without causing any back spin, and generally speaking, this is accomplished by interposing a driving clutch between the holding ratchet and the brakes, and providing manually operable means for forcibly releasing the clutch while the ratchet takes the strain and prevents the back spin.

A simple embodiment particularly adapted for hopper cars is shown in the accompanying drawings, in which Fig. 1 is a plan view with a portion of the casing cut away along line 1—1 of Fig. 2;

Fig. 2 is a side elevation with the casing broken away on the line 2—2 of Fig. 1;

Fig. 3 is a vertical section on the line 3—3 of Fig. 1;

Figs. 4, 5 and 6 are perspective views showing the parts in three positions they assume; in Fig. 4 they are in what may be called normal position, it is also the position when the brakes are applied and set; in Fig. 5 they are in the position assumed during graduated release, and in Fig. 6 they are in the position of full release;

Fig. 7 is a diagrammatic assembly view showing the apparatus applied to a hopper car, Fig. 8 is a fragment showing selected parts in the position they assume during graduated release; and Fig. 9 is a perspective view of a modified form of some of the parts.

But these drawings and the specific description that follows are used to disclose and illustrate the invention and not to define its scope.

The hand wheel 10 is fixed upon the squared shank 11, of the driving shaft 12, carrying a pinion 13, meshing with a gear 14 on a drum 15 for a chain 16 connected to the upper end of a rod 17, the lower end of which is pivoted to a rocker 18 operating a chain 19, connected with a hand brake rod 20 which, in turn, is connected with the foundation brake gear indicated diagrammatically by the cylinder lever 21, the truck levers 22, and the brake shoes 23.

Power applied to the hand wheel will be multiplied and transmitted to the foundation brake gear for applying the brakes.

The shaft 12 is journaled in bearings 24 and 25 carried by a frame and housing consisting of a front 26 and a back 27, by which the parts are enclosed and mounted in position on the car.

A holding ratchet consisting of a ratchet wheel 28 and a pawl 29 is provided to hold the brakes set. It is convenient to make the ratchet wheel 28 integral with the shaft 12 and locate it adjacent to the bearing 24, as appears most clearly in Figs. 1 and 3. The pawl 29 is carried by what amounts to a pawl shaft 30 having trunnions 31 journaled in the housing parts 26 and 27, and this shaft also carries a pawl releasing arm 32 and a pawl engaging arm 33.

Somewhere in the line of force between the holding ratchet and the brakes, the invention contemplates use of a driving clutch and, for manufacturing convenience, a jaw clutch 34 is located on the shaft 10 just to the left of the ratchet wheel 28 in Fig. 3. The fixed part 35 is made integral with the shaft, and the sliding part 36 is made integral with the pinion 13, and mounted to slide and rotate on the shaft 12.

The jaw clutch is operated by two cams 37 and 38 on a control shaft 39, having trunnions 40 journaled in the housing parts 26 and 27, and this shaft is equipped at the outer end with a control handle 41. The sliding clutch part 36 has a flange 42 by which it is shifted. When the control shaft is rotated clockwise in Fig. 2, and counter clockwise in Figs. 4, 5 and 6, the cam 38 engaging the flange 42, forces the sliding clutch part upwardly in Fig. 1, out of engagement with the fixed part. By preference this cam 38 is made to act as a wedge between the inner face of the ratchet wheel 28 and the opposed face of the flange 42, thereby giving great power with little tendency to disarrange the parts at their bearings. A reverse movement of the control shaft causes the cam 37 to engage the inner face of the flange 42 and reengage the driving clutch.

It follows that by throwing the control handle 41 from the position shown in Fig. 4 to that shown in Fig. 6, the brakes are completely released. It will be noted that the reaction will force the pawl 29 to stay in engagement with the ratchet wheel 28 until the driving clutch is disengaged. There is, therefore, no spinning of the hand wheel 10, or any other handle that may be used in its stead.

In order to enable the operator to make a graduated release the pawl 29 is given a normal tendency to release the ratchet. This is accomplished in the first form illustrated by providing what may be called a trip, consisting of a shaft 43 journaled in the back plate 27, and a web 44, and carrying a pawl releasing arm 45 and a pawl engaging arm 46 for engaging with the corresponding arms 32 and 33 on the pawl shaft 30. The arm 46 is given the form of a weight with the result that the arm 45 normally urges the arm 32 upwardly and in consequence, urges the pawl 29 out of engagement with the ratchet 28. The control shaft 39 is provided with a cam 47 which engages the arm 45 on the trip when the handle is thrown to the position in Figs. 2 and 4, whereby the weight of the handle 41 overcomes the tendency of the trip and forces the pawl 29 into engagement with the ratchet 28.

The location and arrangement of the cams 37, 38 and 47 is such that the control handle 41 may be moved from the position shown in Fig. 4 to that shown in Fig. 5 to release the trip without either releasing the jaw clutch, or putting the cam 37 in such position that it may be released. Hence, with the control handle in the position shown in Fig. 5, the brakeman may give the hand wheel 10 a slight movement clockwise (relieving the strain on the pawl 29, which is then raised by the trip), and then gradually ease off on the hand wheel and consequently, graduate the release of the brakes.

A spring 48 (Figs. 2 and 8) yieldingly holds the control handle 41 in position for graduated release.

The gear 14 is somewhat wider than the pinion 13 so that they may remain engaged when the driving clutch is released. The gear 14 is conveniently cast in one piece with the drum 15 and journaled on the shaft 49, mounted in the housing parts 26 and 27, as shown in Fig. 3.

*Operation*

The normal position of the parts is shown in Figs. 1, 2, 3 and 4. The brakes are applied by rotating the hand wheel 10 in a clockwise direction. The operating handle 41 serving to overcome the weighted arm 46 of the trip, and force the pawl 29 into engagement with the ratchet wheel 28 through the cooperation of the arms 45 and 32, all as shown in Fig. 4.

To completely release the brakes the control arm 41 is thrown to the position shown in Fig. 6, forcibly disengaging the driving clutch by the action of the cam 38 on the flange 42 of the movable part 36 of the clutch.

In Fig. 6 the pawl 29 is shown disengaged from the ratchet wheel 28, but this does not occur until after the driving clutch is disengaged.

For graduated release the operating handle 41 is thrown from the position shown in Fig. 4 to the position shown in Fig. 5, where it will be noted that the driving clutch is still held engaged, hence, the brakeman can increase the strain on the gear which, in effect, relieves the reaction of the ratchet wheel 28 on the pawl 29, and the trip throws the latter to the position shown in Fig. 5, when slacking off on the wheel will gradually release the brake.

In the modified form shown in Fig. 9, the trip, as a separate element, has been eliminated. The arm 133, corresponding to the arm 33, is extended with a weight 146, and the arm 147, corresponding to the arm 47, is made to engage the arm 32. The operation of this form is substantially the same as the other, but it is somewhat simpler in construction.

I claim as my invention—

1. In a brake mechanism for railway cars, a handle for applying the brakes by hand, a rotary shaft receiving power from the handle, means for connecting the shaft with the brakes including a driving clutch, a holding ratchet between the driving clutch and the handle and operative to make the brakes fast in applied position, and manually operable control means acting in one position to restrain disengagement of the clutch and the ratchet and movable to a position in which the ratchet is free for disengagement while the clutch is still engaged.

2. In a brake mechanism for railway cars, a handle for applying the brakes by hand, a rotary shaft receiving power from the handle, means for connecting the shaft with the brakes including a driving clutch, a holding ratchet between the driving clutch and the handle and operative to make the brakes fast in applied position, and manually operable control means acting in one position to restrain disengagement of the clutch and the ratchet and movable to a position in which the ratchet is free for disengagement while the clutch is still engaged, and associated means to release the ratchet.

3. In a brake mechanism for railway cars, a handle for applying the brakes by hand, a rotary shaft receiving power from the handle, means for connecting the shaft with the brakes including a driving clutch, a holding ratchet between the driving clutch and the handle and operative to make the brakes fast in applied position, and manually operable control means acting in one position to restrain disengagement of the clutch and the ratchet, and movable to a position in which the ratchet is free for disengagement while the clutch is still engaged, and means to hold the control means in the last mentioned position.

4. In a brake mechanism for railway cars, a handle for applying the brakes by hand, a rotary shaft receiving power from the handle, means for connecting the shaft with the brakes including a driving clutch, a holding ratchet between the driving clutch and the handle and operative to make the brakes fast in applied position, release means tending to release the ratchet and manually operable control means for throwing the ratchet into engagement after the clutch is engaged.

5. In a brake mechanism for railway cars, a handle for applying the brakes by hand, a rotary shaft receiving power from the handle, means for connecting the shaft with the brakes including a driving clutch, a holding ratchet between the driving clutch and the handle and operative to make the brakes fast in applied position, a pivoted trip tending to release the ratchet and manually operable means normally holding the ratchet and the clutch engaged, and movable to free the ratchet for release by the trip while holding the clutch engaged.

6. In a brake mechanism for railway cars, a handle for applying the brakes by hand, a rotary shaft, receiving power from the handle, means for connecting the shaft with the brakes including a driving clutch, a ratchet wheel on the shaft, a pivoted pawl, a trip tending to release the pawl from the ratchet wheel, a cam shaft, a cam on the shaft for shifting the clutch, and another cam on the shaft for forcing the pawl to engage the ratchet wheel against the resistance of the trip.

7. In a brake mechanism for railway cars, a handle for applying the brakes by hand, a rotary shaft receiving power from the handle, means for connecting the shaft with the brakes including a driving clutch, a ratchet wheel on the shaft, a pivoted pawl, a trip tending to release the pawl from the ratchet wheel, a cam shaft, a cam on the cam shaft for engaging the pawl with the ratchet wheel against the resistance of the trip and another cam on the cam shaft arranged to hold the clutch engaged after the first cam has released the pawl to the action of the trip.

8. In a hand brake, a rotary shaft, a handle for driving the shaft, a driving clutch including a part slidable on the shaft and having a flange, a cam shaft alongside the first shaft, cams on the cam shaft to operate on the flange and shift the slidable clutch part and thereby engage or disengage the clutch, a ratchet to restrain reversal of the rotary shaft, a trip tending to disengage the ratchet and a cam on the cam shaft to positively engage the ratchet.

9. In a hand brake, a hand power shaft carrying a handle, a ratchet wheel and a sliding clutch part in the order named, a second shaft carrying a pawl for the ratchet, a pawl releasing arm and a pawl engaging arm, a third shaft carrying a pawl releasing arm and a pawl engaging arm adapted to cooperate respectively with the corresponding arms carried by the second shaft, and a fourth shaft carrying a cam to cooperate with the sliding clutch part, and a cam to cooperate with the pawl releasing arms of the third shaft.

HENRY I. WRIGLEY.